United States Patent
Singh et al.

[11] Patent Number: 6,156,202
[45] Date of Patent: Dec. 5, 2000

[54] CONDUCTING POLYMER MEMBRANE AND A PROCESS FOR THE PREPARATION OF THE SAME MEMBRANE

[75] Inventors: Ramadhar Singh; Subhas Chandra; Hawa Singh; Amarjeet Kaur Narula; Shobha Broor, all of New Delhi, India

[73] Assignees: Council of Scientific and Industrial Research and Department of Biotechnology; Government of India, both of New Delhi, India

[21] Appl. No.: 09/281,413

[22] Filed: Mar. 30, 1999

[30] Foreign Application Priority Data

May 15, 1998 [IN] India ............................... 1302/DEL/98

[51] Int. Cl.⁷ .......................... B01D 71/06; B01D 67/00
[52] U.S. Cl. .............................. 210/500.27; 210/500.28; 210/490; 264/41; 427/244
[58] Field of Search .............................. 210/490, 500.27, 210/500.28, 257.2; 427/244; 252/518; 528/423; 526/258, 391; 264/41

[56] References Cited

U.S. PATENT DOCUMENTS 4,976,860  12/1990  Takahashi et al. ................. 210/500.38
5,306,443  4/1994   Kaneko et al. .......................... 252/518
5,489,400  2/1996   Liu et al. ................................. 528/391
5,605,993  2/1997   LeClerc .............................. 210/500.28

*Primary Examiner*—Ana Fortuna
*Attorney, Agent, or Firm*—Ladas & Parry

[57] ABSTRACT

As per the World Health organization (WHO) requirement, the water for drinking purposes should be 100% virus free. This invention reports a polymer impregnated porous substrate membrane and method for the preparation of said membrane for capturing viruses from water. The water filtered through the membrane prepared by the process of the present invention has been tested to be virus free and fully potable based on the tests carried out at the Department of Microbiology, All India Institute of Medical Sciences, New Delhi, India and Sriram Institute for Industrial Research (an ISO 9001 R&D Organization), New Delhi, India. The invention will be of immense use especially for the developing countries and third world countries which are subjected to the problem of unsafe drinking water. This invention is useful also for the developed countries for use in water treatment plants due to highly industrialized nature and existence of a variety of manufacturing units like chemicals and fertilizers.

7 Claims, 2 Drawing Sheets

FT-IR SPECTRUM OF COPOLYMER [P(PY-NMPY)] IMPREGNATED FILTER PAPER.(a) SPECTRUM OF FRESHLY PREPARED SAMPLE. (b) SPECTRUM OF THE SAME SAMPLE AFTER 8 MONTHS

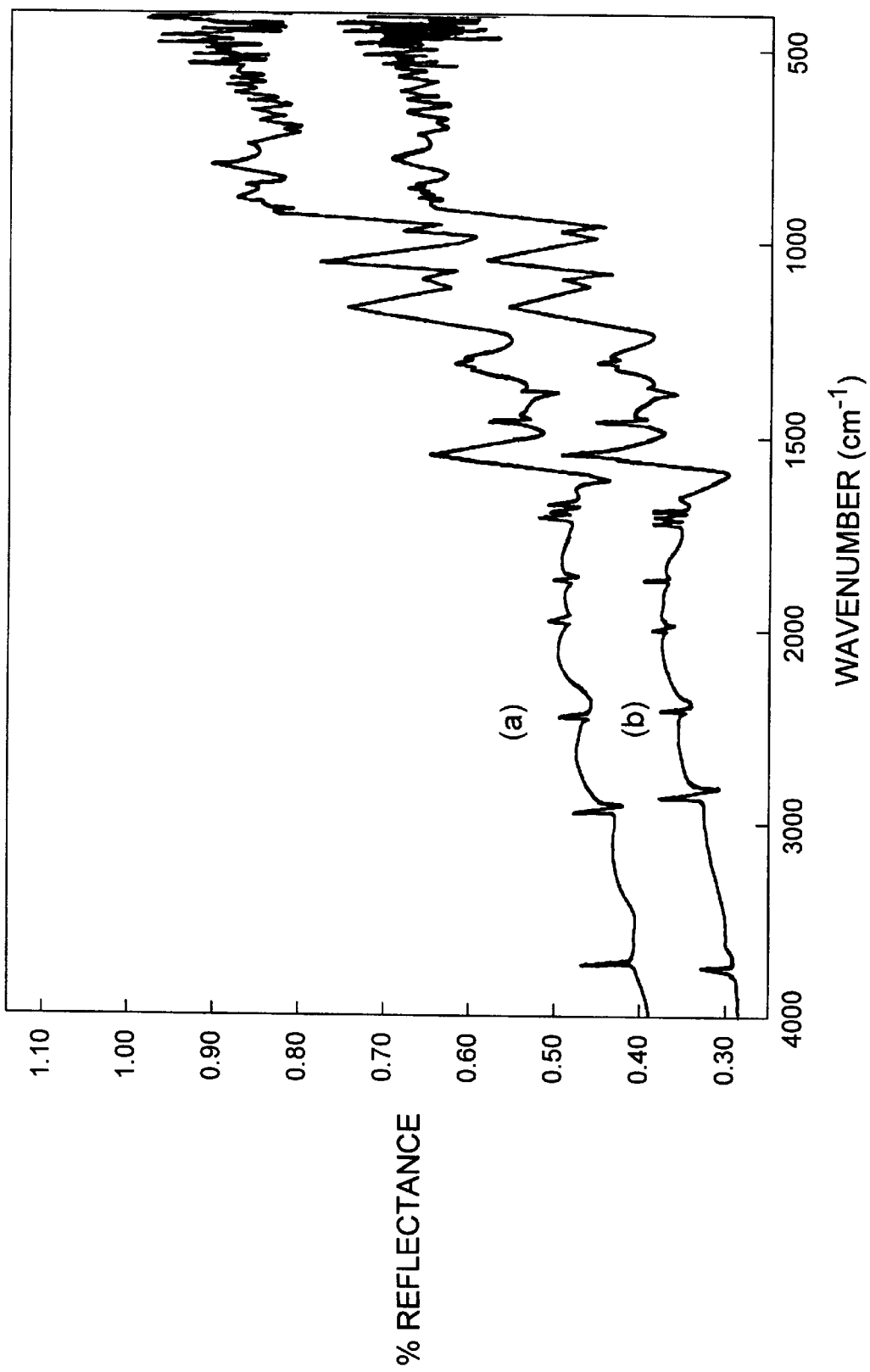
FIG. 1 FT-IR SPECTRUM OF COPOLYMER [P(PY-NMPY)] IMPREGNATED FILTER PAPER. (a) SPECTRUM OF FRESHLY PREPARED SAMPLE. (b) SPECTRUM OF THE SAME SAMPLE AFTER 8 MONTHS

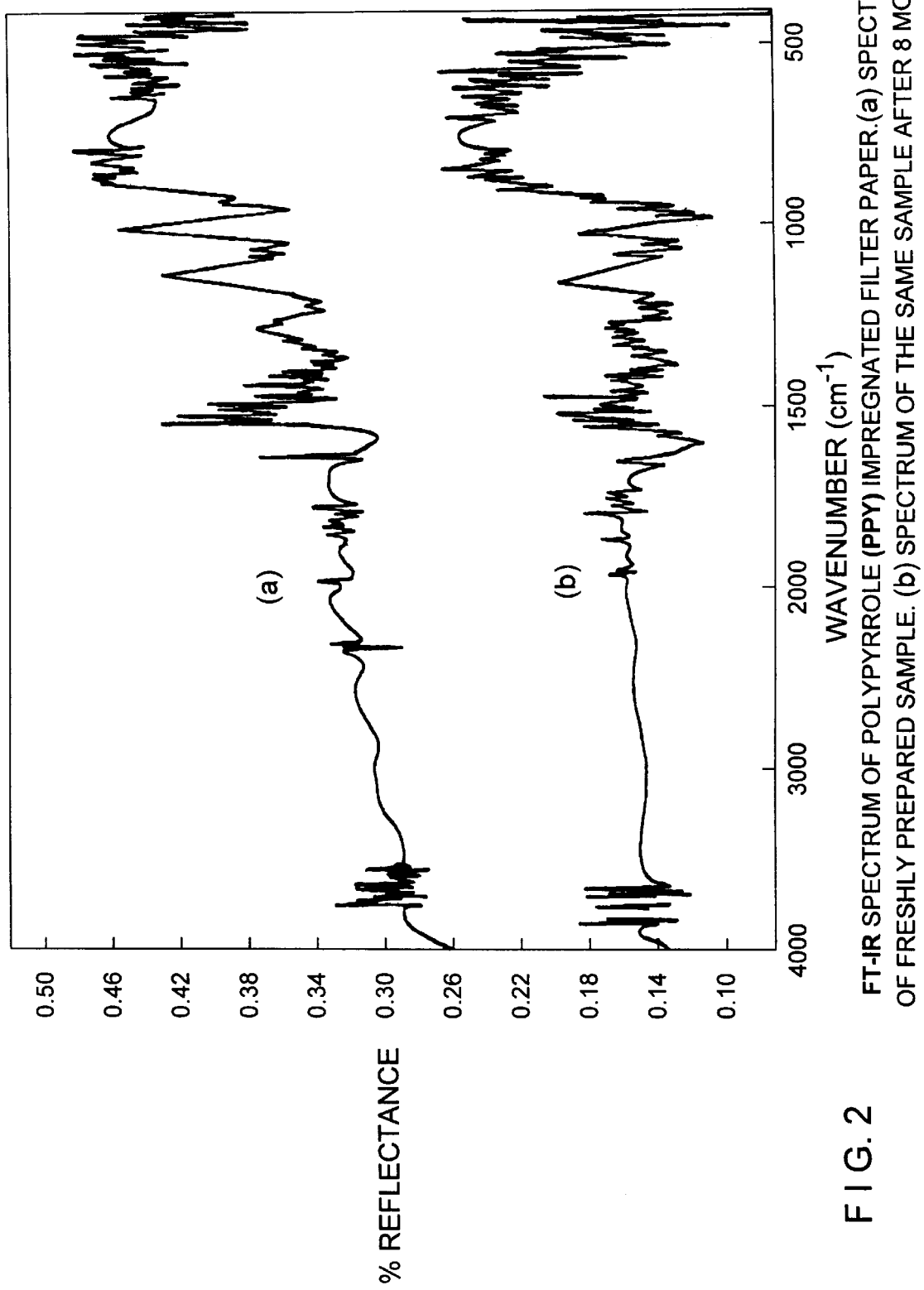
FIG. 2  FT-IR SPECTRUM OF POLYPYRROLE (PPY) IMPREGNATED FILTER PAPER. (a) SPECTRUM OF FRESHLY PREPARED SAMPLE. (b) SPECTRUM OF THE SAME SAMPLE AFTER 8 MONTHS

CONDUCTING POLYMER MEMBRANE AND A PROCESS FOR THE PREPARATION OF THE SAME MEMBRANE

FIELD OF INVENTION

The present invention relates to a conducting polymer impregnated porous substrate membrane and a method for the preparation of the said membrane.

More particularly the invention relates to a method for the preparation of a copolymer impregnated porous substrate membrane useful as a water filter for capturing viruses.

BACKGROUND OF THE INVENTION

Viruses which pollute water are excreted with faeces or urine from human beings and many species of animals. These viruses include polio virus, coxsackie virus, echo virus and other entero viruses, adeno virus, reo virus, rota virus, hepatitis A virus, etc. which can cause acute infectious non-bacterial gastroenteritis. These viruses are, mostly, present in relatively large numbers in sewage contaminated water or ground water. As per World Health Organization (WHO) recommendations drinking water should be free from any viruses and no virus should be detectable in samples of 100–1000 liters of directly reclaimed drinking water as described in a report of a WHO Scientific Group published in WHO Technical Report Series 639, WHO, Geneva (1979). For public health, the development of reliable, sensitive and practical methods for detecting viruses in large quantities of water is very essential. Most of the methods of virus concentration have been developed for polio virus. Viruses can be concentrated from water samples by viradel (virus adsorption-elution) technique. The virus gets adsorbed presumably by both electrostatic and hydrophobic interactions between the virus and the filter matrix.

However, these previously developed methods for concentration of entero viruses from water have proved to be of limited value when applied to the concentration of rota viruses. Although, ultrafilteration is an extremely useful method for concentrating viruses, it is only effective when applied to relatively small volumes of water, which have low turbidities. Since, ultrafilteration depends on the physical size of the virus particle the pore size has to be in nanometer range. This type of filter will rapidly clog, thus limiting the water volume which can be processed. In addition, the bulky equipment used for concentration of viruses limits sampling to readily accessible areas as described by G. A. Toranzos and C. P. Gerba, in J. Virological Methods, 24, 131 (1989).

Concentration of viruses from water has been performed by using both electronegative as well as electropositive filters as given by G. Sansebastiano et al. in L'Igiene Moderna, 93, 785 (1990). The conventional micro porous electronegative (having negative charge on the surface) adsorbent filters adsorb viruses more efficiently in the presence of multivalent cations such as $Al^{3+}$ and $Mg^{2+}$ on/or at low pH usually 3.5. The efficient virus adsorption occurs only if water is acidified to pH 3.5 and/or multi cation salts are added. The major drawback is the extensive modification of the water sample. The strongly acidic and basic pH levels are utilized for the formation of precipitates during the reconcentration and their susceptibility to the variation in the quality of water sample.

The electropositive filters are composed of fibre glass or cellulose acetate and positively charged organic polymer resin as described in 'Standard Methods for the Examination of Water and Waste-Water' edited by Andrew D. Etaon et al., 19th edition, American Public Health Association, Washington D.C., 1995. The microporous filters which are positively charged are advantageous over negatively charged filters as the virus adsorbence occurs for most natural and tap water in the pH range~pH 5–9, because they reduce or eliminate the need for either acid or salt addition to obtain virus adsorption as described by M. D. Sobsey and B. L. Jones, in Applied & Environmental Microbiology, 37, 588 (1979).

Bocchi et. al (J. Mater. Sci., 26, 3354 (1991)) reported that the polypyrrole deposited on glass fibre membrane is very efficient in capturing viruses as compared to the same polpyrrole deposited on paper. But by repeating the same experiment the inventors of the present invention obtained conductivity~$10^{-2}\ \Omega^{-1}\ cm^{-1}$ contrary to their reported Value of $10\ \Omega^{-1}\ cm^{-1}$ using glass fibre substrate. Further, the electrical conductivity reported by Bocchi et. al (1991) in the same publication was $50\ \Omega^{-1}\ cm^{-1}$ using filter paper where as the present inventors obtained the conductivity~$1\ \Omega^{-1}\ cm^{-1}$ for the polypyrrole impregnated filter paper. Moreover, the adhesivity of the polypyrrole on the glass fibre was poor as a result of which the deposition was flaky and could easily come out when water is poured. In addition, the membrane was washed with dilute hydrochloric acid both in case of fibre glass and paper membrane questioning thereby the potability of the filtered water.

The conventional micro porous filters suffer from three main limitations: (a) simple suspended matter tends to clog the adsorbent filter thereby limiting the volume that can be processed and possibly interfering with elution process; (b) dissolved and colloidal organic matters in some waters can interfere with virus adsorption to filters presumably by competing with viruses for adsorption sites and they also can interfere with virus elution; (c) viruses adsorbed to suspended matter may be removed in any cleaning process applied before virus adsorption as described in 'Standard Methods for the Examination of Water and Waste-Water' edited by Andrew D. Eaton et al., 19th edition, American Public Health Association, Washington D.C., 1995. Thus, the majority of processes used to treat sources of potable water are capable of reducing virus numbers but with possible exception of high-grade disinfection, none of them can be relied upon to remove the virus under all circumstances.

In the conventional water treatment the rapid sand filtration or micro straining results in negligible reduction in virus number. Flocculation processes, generally combined with rapid filtration, have been explained to remove 60–99% viruses. However, viruses removed by flocculation is not inactivated. Lime flocculation, which is often applied to renovated waters, is very effective provided the alkaline conditions (pH>11.5) are maintained for at least 1 hr. Adsorption by activated carbon can remove viruses but the adsorbed viruses may be liberated at later stage when organic material competes for adsorption sites. Disinfecting process can destroy viruses when used correctly. The most widely used disinfectants are chlorine and ozone. The chlorine is highly effective virucide whereas combined chlorine is far low effective. The amount of chlorine required will depend upon quality of water, in particular its pH value, ammonia and organic solvent. In circumstances where drinking water is likely to become contaminated, it is not possible to achieve complete protection. Moreover, when water containing organic matter is chlorinated, carcinogenic compounds like trihalomethanes may be formed. Ozone has also been shown to be effective viral disinfectant preferably for clean water, but it is not possible to maintain a residual in distribution system. Under the average conditions of operations of many treatment plants, it can be expected that viruses from contaminated water sources may penetrate the drinking water distribution systems.

All sewage treatment processes remove or destroy viruses to some degree. Primary sedimentation can remove a significant proportion of viruses (up to 50%) owing to their association with solid matter. Of secondary treatment procedures, the activated sludge process removes 60–99% of viruses present. Chemical coagulation is regarded as one of the most effective single step treatments. Lime is probably most efficient, since it not only removes viruses physically but also inactivates them by exposing them to high pH. The filtration of coagulated effluents is an additional important process. Adsorption methods using clays, coal or activated carbon can remove viruses to some extent, but the process is not efficient. The application of wastewater to land can be a valuable tertiary treatment and is being used successfully in number of countries. Little evidence is available about the survival of viruses in the soil or run off water but a number of studies show clearly that they can survive for long periods in soil and may be eluted by heavy rainfall. Under these circumstances, some form of disinfection must be applied to render waste water safe before discharge into environment. Chlorine is widely used for this purpose but its efficacy is reduced by the presence of organic material, inadequate contact time, insufficient dose, temperature, pH and presence of ammonia. Due to these factors, chlorination becomes ineffective. So the conventional treatment plants are not 100% efficient in removing virus.

Assuming that a population of one million consumes conventionally treated water having 1 infectious unit per 20 liters and assuming each person drinks 1 liter of this water daily, then 50,000 persons ingest one infectious particle per day. Due to immunity of those persons if only 1% gets infection i.e. 500 persons per day or 1,82,500 persons per year they can still further act as carrier to infect their contacts. If 10 in 500 infected persons become ill, 3650 persons get clinical disease every year. On the basis of these considerations WHO concluded that the presence of even a few enteric viruses in a large volume of drinking water should be prevented as described in a report of a WHO Scientific Group published in WHO Technical Report Series 639, WHO, Geneva (1979).

OBJECTS OF THE INVENTION

The main object of the present invention is to provide a method for the preparation of a copolymer impregnated porous substrate membrane as a filter for capturing viruses in water to make it 100% virus free as per WHO requirement.

Another object of the present invention is to use the said conducting polymeric membrane which has the unique property of carrying out large number of charge carriers in their polyconjugated backbone for virus filtration.

Yet another object is to provide a conducting polymeric membrane which is 100% safe and useful filter for capturing viruses in drinking water.

SUMMARY OF THE INVENTION

The basic idea of this invention is that in the doped state most of the conducting polymers have the unique property of carrying large number of charge carriers which can capture viruses by electrostatic interactions and when impregnated on a porous substrate like a filter paper these conducting polymeric membrane filters were tested for virus retention on it using stock solutions of viruses prepared using polio I virus. Other water borne viruses such as coxsackie B virus, rota virus and hepatitis A virus may also be used for preparing stock solution of viruses. Although the samples could be prepared by using pyrrole only, the presence of N-methyl group improves the strength and stability of the membrane. The process used for virus filtration and titration is described below.

DESCRIPTION OF DRAWINGS

FIG. 1 depicts the FT-IR spectra of copolymer [P(PY-NMPY)] impregnated filter paper wherein trace (a) shows the spectrum for the freshly prepared sample and (b) shows the spectrum for the same sample after eight months.

FIG. 2 depicts the FT-IR spectra of polypyrrole (PPY) impregnated filter paper wherein trace (a) shows the spectrum for the freshly prepared sample and (b) shows the spectrum for the same sample after eight months.

The spectra depicted in FIGS. 1 and 2 were recorded on Model 2000, Perkin Elmer FT-IR spectrometer.

DETAILED DESCRIPTION

The three methods generally used to prepare conducting polymers are: (i) chemical polymerization in solution; (ii) chemical vapour deposition and (iii) electrochemical polymerization. The general scheme for preparation of conduction polymers is oxidative coupling which involves the oxidation of monomers to form cations radicals followed by coupling to form di cations and repetition of process to produce a polymer. Oxidative coupling can be done by electrochemical or chemical process. By selection of suitable oxidant, synthetic medium and monomer, one can perform polymerization process to obtain a desired polymer.

Accordingly the present invention provides a conducting copolymer impregnated porous substrate membrane having electrical conductivity ranging between $5.9\times10^{-1}$–$1.7\times10^{-1}$ $\Omega^{-1}$ $cm^{-1}$ and a shelf life of at least 8 months, and a process for the preparation of said membrane which comprises i) distilling pyrrole and N-methyl pyrrole separately by known methods;

ii) mixing 90 to 99.9 vol % distilled pyrrole and 10 to 0.1 vol % distilled N-methyl pyrrole obtained in step (i) above, followed by cooling the mixture to a temperature below 4° C. and upto −10° C.;

iii) mixing 60 to 40 vol % alkyl acetate to 40 to 60 vol % cooled pyrroles mixture obtained in step (ii) above;

iv) soaking a porous substrate in the mixture obtained in step (iii) above, cooling the said impregnated substrate to a temperature below 4° C. and allowing it to stand for at least 1 hr;

v) treating the impregnated substrate obtained in step (iv) above with a solution of ferric chloride in an inert atmosphere at a temperature ranging between 1° C. to −10° C. for a period ranging from 1 to 5 hrs. to obtain a conducting co polymeric membrane;

vi) washing the polymeric membrane obtained in step (v) above followed by drying in oxygen free atmosphere to obtain the desired membrane.

In an embodiment of the present invention, the distillation of the pyrroles may be effected using known methods such as vapour condensation.

In another embodiment of the present invention, the alkyl acetate used as stabilizer may be selected from methyl acetate, ethyl acetate and propyl acetate.

In yet another embodiment of the present invention, the porous substrate used is filter paper.

In yet another embodiment of the present invention the oxidizing agent used is ferric chloride.

In another embodiment of the present invention solution of the oxidizing agent used may be prepared using any clean water such as distilled water or de ionized water.

In yet another embodiment of the present invention, the washing of conducting polymeric membrane may be done using any clean water selected from distilled water and de ionized water.

In a further embodiment of the present invention, the inert atmosphere may be selected from nitrogen, argon and helium.

In another embodiment of the present invention, a conducting copolymeric impregnated porous substrate membrane is capable of completely removing polio-I virus from the water filtered through the membrane In yet another embodiment of the present invention the copolymeric membrane impregnated porous substrate as prepared in accordance with the features of the invention can be used in a water filter system by sandwiching the said membrane in any support mechanism.

In a further embodiment of the present invention, membrane prepared by the process of the subject invention can also be used in a miniaturized water filter or in a community water filter system.

In still another embodiment of the present invention the membrane prepared by the process of the subject invention is also easily replaceable.

Membrane Preparation

The process of the present invention as described in detail, is only illustrative in nature given below and should not be construed to limit the scope of the invention.

Pyrrole monomer was distilled and kept in a refrigerated environment. Also the N-methyl pyrrole monomer was distilled and placed in the refrigerated environment. Both the distilled monomers were kept in the refrigerated environment for 1–6 hrs. Subsequently both the monomers were mixed and their mixing volume ratio was in the range of 90–99.9% for pyrrole and 10–0.1% for N-methyl pyrrole respectively. Then 60 to 40 vol % alkyl acetate such as methyl acetate, ethyl acetate, propyl acetate was mixed with the 40 to 60 vol. % resultant monomers mixture. Then the final mixture was rinsed and filter papers of different diameters according to the requirement were put in the mixture for soaking. This was kept in a refrigerated environment below 4° C. for a time period of at least 1 hr. Then the oxidant (ferric chloride) solution was prepared in the concentration range of 0.4–1.5 Molar using clean water such as distilled water or de ionized water. Then the oxidant was placed in the refrigerated environment for the time period in the range of 0.5–3 hrs. An especially designed double walled glass container was used for polymerization. The temperature of the container was maintained by the flow of cooled ethylene glycol liquid from the cold bath, between the walls of the container. The temperature of the bath was maintained in the range of −12 to −1° C. Then the mixture soaked filter papers were placed in this glass container and the oxidant solution was poured on the soaked filter papers to initiate polymerization. Before the oxidant was poured on the soaked filter papers, the environment in the glass container was made inert using the inert gas such as argon, nitrogen, helium, etc. The polymerization time was kept at least 1 hr and the polymerization was performed at temperatures in the range of −10 to 1° C. under inert atmosphere. During polymerization the copolymer film P(PY-NMPY) was deposited in the pores and on to both the surfaces of the filter papers making a composite structure. Then the prepared conducting polymeric membrane filters were washed with any clean water such as distilled water, deionized water, etc. After that the prepared conducting polymeric membrane filters were placed in a vacuum oven in the temperature range of 30–60° C. for the time period 1–12 hrs.

Characterization of the Membrane

The effect of temperature on the conductivity and the substrate has been invrestigated in order to optimise the preparation. Table 1 shows the conductivity of the membranes prepared by using filter paper as porous substrate at different temperatures whereas the other preparation conditions remain same. Similar method was adopted when fibre glass substrate was used. With respect to the conductivity data the 0° C. temperature was found to be most optimum. The deposition of the copolymer P (PY-NMPY) on the fibre glass was flaky and moreover the obtained conductivity was less by an order.

FIG. 1 shows the FT-IR spectra of the copolymer [P(PY-NMPY)] which includes the spectrum of freshly prepared sample and of the same sample after 8 months. These spectra of the membranes were recorded in reflectance mode. Although the peak intensity of the samples depend upon the scanned area of the samples, the comparison of the peak positions indicates that almost all the peaks are retained even after 8 months and moreover no significant change in the width of the peaks and the shift in peak position has been observed which indicates the sample stability. The presence of dication bands at 935 $cm^{-1}$ in both the samples further indicate that the samples are not fully reduced. This is further supported by the fact that such as significant features of the oxidised samples like a set of strong relatively broad absorption bands between 1600 and 450 $cm^{-1}$, due to C—H stretching near 2900 $cm^{-1}$ and absence of 3300 $cm^{-1}$ have been observed.

FIG. 2 shows the FT-IR spectra of the samples when only pyrrole has been used for polymerization. The comparison of the spectra of the grown samples of polypyrrole impregnated filter papers and of the same samples after 8 months indicate that there is a drastic change in the intensity, peak position and the width, which shows the poor shelf life of the membranes prepared by using pyrrole only. Although the samples could be prepared by using only pyrrole monomer, t the presence of N-methyl group improves the strength and stability of the membrane.

Virus Filtration and Titration

A known amount of stock virus (as for example polio I virus–$5\times10^3$ to $2\times10^5$ pfu/ml) was diluted up to 100 ml with phosphate buffer saline, pH 7.2 and was passed through polymeric membrane filter contained in a filtration system. The filterate and the elute were obtained by incubating the membrane in 10% of the fetal calf serum (FCS) containing minimum essential medium (MEM) (pH 9.6) at 4° C. overnight. Aliquots of stock, elute and filterate were stored at −70° C. till the quantification of virus by plaque assay technique was done. The plaque assay technique is the most precise method for enumerating virus multiplicities as described by W. F. Hill, Jr., E. W. Akin and W. H. Benton in Water Research, 5, 967 (1971). The amount of virus present in three fractions namely stock, elute and filtrate was determined by plaquing viruses in 24 well plates containing mono layer of Buffalo Green Monkey Kidney (BGMK) cells. Under optimal condition a plaque originates from a single infectious virus particle. First serial log dilutions of the fractions were prepared with diluent (MEM without FCS). Then the 24 well plates containing confluent mono layer of BGMK cell line was washed twice with phosphate buffer saline (pH 7.4), the dilutions (200 µl) of the three fractions were added to the cell mono layers and incubated at 37° C. for one hour for the adsorption of virus particles to the host cells. After incubation, excess virus suspension was aspirated and the mono layer was overlaid with plaque medium containing agarose (0.8%). Virus particles infecting and replicating in the cells are localized by the solid overlay and the virus spreads from initially infected cell to adjacent cell producing circumscribed foci of cellular degeneration. On 3rd day, solidified medium was scooped out, mono layer was washed with buffer saline and stained with 0.5% of crystal violet. Virus infected cells appeared as clear unstained areas against a background of stained viable cells.

The following examples are given by way of illustration of the present invention and should not be construed to limit the scope of the present invention.

EXAMPLE 1

Pyrrole and N-methyl pyrrole were distilled separately. Both these distillates were cooled at 0° C. for 30 min. Then 1 ml of the cooled N-methyl pyrrole was added to 99 ml of cooled pyrrole and were mixed together. 60 ml of this pyrrole mixture was mixed with 40 ml of ethyl acetate and two filter papers were added to the resultant mixture in a petri dish and this was kept for cooling at −4° C. for 2 hr. 1.1 molar solution of ferric chloride was prepared and cooled at −4° C. for 30 min. Meanwhile the temperature of the cold bath was maintained at −5° C. and the liquid of the cold bath was allowed to pass between the walls of the container for maintaining the temperature of the container at −3° C. The impregnated substrate i.e. pyrroles soaked filter papers were taken out and kept in double walled glass container and the container was closed with airtight lid and dry nitrogen was bubbled out in the container through the opening in the lid to maintain the inert atmosphere. The cooled ferric chloride solution was poured in the container through the opening in the lid of the container and polymerization was allowed to carry on for 5 hrs. After that the prepared membrane was taken out and washed with distilled water and kept in vacuum oven at 39° C. for 5 hrs. The conducting polymeric membrane as prepared herein was tested for virus retention on it by using stock solution of $1 \times 10^4$ PFU of polio I virus by the process described above. The test results are: Virus in the filtrate −0 PFU.

EXAMPLE 2

Pyrrole and N-methyl pyrrole were distilled separately. Both these distillates were cooled at 0° C. for 15 min. Then 2 ml of the cooled N-methyl pyrrole was added to 98 ml of cooled pyrrole and were mixed together. 33 ml of this pyrrole mixture was mixed with 27 ml of ethyl acetate and two filter papers were added to the resultant mixture in a petri dish and this was kept for cooling at 0° C. for 14 hrs. 0.95 molar solution of ferric chloride was prepared and cooled at −10° C. for 30 min. Meanwhile the temperature of the cold bath was maintained at −12° C. and the liquid of the cold bath was allowed to pass between the walls of the container for maintaining temperature of the container at −10° C. The impregnated substrate i.e. pyrroles soaked filter papers were taken out and kept in double walled glass container and the container was closed with airtight lid and dry nitrogen was bubbled out in the container through the opening in the lid to maintain the inert atmosphere. The cooled ferric chloride solution was poured in the container through the opening in the lid of the container and polymerization was allowed to carry on for 3 hrs. After that the prepared membrane was taken out and washed with distilled water and kept in vacuum oven at 30° C. for 12 hrs. The conducting polymeric membrane as prepared herein was tested for virus retention on it by using stock solution of $2 \times 10^5$ PFU of polio I virus by the process described above. The test results are: Virus in the filtrate −0 PFU.

EXAMPLE 3

Pyrrole and N-methyl pyrrole were distilled separately. Both these distillates were cooled at −4° C. for 25 min. Then 3 ml of the cooled N-methyl pyrrole was added to 27 ml of cooled pyrrole and mixed together. 13.5 ml of this pyrrole mixture was mixed with 16.5 ml of methyl acetate and one filter paper was added to the resultant mixture in a petri dish and this was kept for cooling at 0° C. for 6 hrs. 0.8 molar solution of ferric chloride was prepared and cooled at 0° C. for 30 min, meanwhile the temperature of the cold bath was maintained at −1° C. and the liquid of the cold bath was allowed to pass between the walls of the container for maintaining the temperature of the container at 1° C. The impregnated substrate i.e. pyrroles soaked filter paper were taken out and kept in double wall container and the container was closed with airtight lid and dry nitrogen was bubbled out in the container through the opening in the lid to maintain the inert atmosphere. The cooled ferric chloride solution was poured in the container through the opening in the lid of the container and polymerization was allowed to carry on for 4 hrs. After that the prepared membrane was taken out and washed with distilled water and kept in vacuum oven at 43° C. for 5 hrs. The conducting polymeric membrane as prepared herein was tested for virus retention on it by using stock solution of $5 \times 10^3$ PFU of polio I virus by the process described above. The test results are: Virus in the filtrate −0 PFU.

EXAMPLE 4

Pyrrole and N-methyl pyrrole were distilled separately. Both these distillates were cooled at 0° C. for 45 min. Then 2 ml of the cooled N-methyl pyrrole was added to 48 ml of cooled pyrrole and were mixed together. 25 ml of this pyrrole was added to 48 mixed with 25 ml of ethyl acetate and two filter papers were added to the resultant mixture in a petri dish and this was kept for cooling at −4° C. for 6 hr. 1.0 molar solution of ferric chloride was prepared and cooled at 0° C. for 30 min, meanwhile the temperature of the cold bath was maintained at −3° C. and the liquid of the cold bath was allowed to pass between the walls of the container for maintaining the temperature of the container at −1° C. The impregnated substrate i.e. pyrroles soaked filter papers were taken out and kept in double walled glass container and the container was closed with airtight lid and dry nitrogen was bubbled out in the container through the opening in the lid to maintain the inert atmosphere. The cooled ferric chloride solution was poured in the container through the opening in the lid of the container and the polymerization was allowed to carry on for 1.5 hrs. After that the prepared membrane was taken out and washed with distilled water and kept in vacuum oven at 40° C. for 4 hrs. The conducting polymeric membrane as prepared herein was tested for virus retention on it by using stock solution of $1 \times 10^4$ PFU of polio I virus by the process described above. The test results are: Virus in the filtrate −0 PFU.

EXAMPLE 5

Pyrrole and N-methyl pyrrole were distilled separately. Both these distillates were cooled at 0° C. for 15 min. Then 2 ml of the cooled N-methyl pyrrole was added to 48 ml of cooled pyrrole and were mixed together. 24 ml of this pyrrole mixture was mixed with 26 ml of ethyl acetate and two filter papers were added to the resultant mixture in a petri dish and this was kept for cooling at 0° C. for 1 hr. 1.0 molar solution of ferric chloride was prepared and cooled at −2° C. for 30 min, meanwhile the temperature of the cold bath was maintained at −2° C. and the liquid of the cold bath was allowed to pass between the walls of the container for maintaining the temperature of the container at 0° C. The impregnated substrate i.e. pyrroles soaked filter papers were taken out and kept in double walled glass container and the container was closed with airtight lid and dry nitrogen was bubbled out in the container through the opening in the lid to maintain the inert atmosphere. The cooled ferric chloride solution was poured in the container through the opening in the lid of the container and polymerization was allowed to carry on for 2 hrs. After that the prepared membranes were taken out and washed with distilled water and kept in vacuum oven at 40° C. for 4 hrs. The conducting polymeric membrane as prepared herein was tested for virus retention on it by using stock solution of $2\times10^4$ PFU of polio I virus by the process described above. The test results are: Virus in the filtrate −0 PRU.

The results of the virus filtration from the conducting polymeric membranes given in the above examples have been summarized in Table 3.

EXAMPLE 6

Pyrrole and N-methyl pyrrole were distilled separately. Both these distillates were cooled at 0° C. for 15 min. Then 1 ml of the cooled N-methyl pyrrole was added to 66 ml of cooled pyrrole and were mixed together. 33 ml of this pyrrole mixture was mixed with 33 ml of ethyl acetate and two filter papers were added to the resultant mixture in a petri dish and this was kept for cooling at 0° C. for 2 hrs. 1.05 molar solution of ferric chloride was prepared and cooled at −4° C. for 30 min, meanwhile the temperature of the cold bath was maintained at −2° C. and the liquid of the cold bath was allowed to pass between the walls of the container for maintaining temperature of the container at 0° C. The impregnated substrate i.e. pyrroles soaked filter papers were taken out and kept in double walled glass container and the container was closed with airtight lid and dry nitrogen was bubbled out in the container through the opening in the lid to maintain the inert atmosphere. The cooled ferric chloride solution was poured in the container through the opening in the lid of the container and polymerization was allowed to carry on for 1.5 hrs. After that the prepared membrane was taken out and washed with distilled water and kept in vacuum oven at 30° C. for 12 hrs.

Testing of Membrane

The conducting polymeric membrane as prepared by the process of subject of matter of the invention was tested for the potability of the water filtered through the membrane. Two samples of water were tested at an ISO 9001 R&D organization. Sriram Institute for Industrial Research, Delhi, Delhi University, Delhi 110 007, India for the potability of water. One sample was municipal water supplied from a residential locality Rajinder Nagar, New Delhi and other water sample was the same water filtered through the membrane. It was found that the water filtered through the membrane can be considered fit for drinking purposes. The results have been tabulated in Table 2.

Copolymeric membrane was also tested for the presence of Polio-I virus in the filtrate. Table-3 gives the concentration of the stock solution of the virus and the presence of virus in the filtrate which was found to be absent in the sample tested for the purpose showing thereby the capability of capturing 100% virus for the use of the membrane prepared by the process of the present invention.

TABLE 1

Testing of copolymer impregnated porous membrane

| Polymerisation Temperature | Conductivity of Polymer coated filter paper ($\Omega^{-1}$ $cm^{-1}$) | Conductivity of Polymer coated glass fabric ($\Omega^{-}$ $cm^{-1}$) |
|---|---|---|
| −7° C. | $1.7 \times 10^{-1}$ | $3.3 \times 10^{-2}$ |
| −5° C. | $2.7 \times 10^{-1}$ | $3.9 \times 10^{-2}$ |
| 0° C. | $5.9 \times 10^{-1}$ | $8.8 \times 10^{-2}$ |
| 10° C. | $1.5 \times 10^{-1}$ | $4.4 \times 10^{-2}$ |
| 22° C. | $2.1 \times 10^{-1}$ | $3.7 \times 10^{-2}$ |

TABLE 2

| S. No. | Physio-chemical characteristics | Results Obtained: MCD water Raw | Results Obtained: MCD water through membrane | ISO requirement Desired limits |
|---|---|---|---|---|
| 1. | Colour, Hazen Unit | less than 5 | less than 5 | 5 (Max) |
| 2. | Odour | Unobjection-able | Unobjection able | Unobjectionable |
| 3. | Turbidity, NTU | 1 | 1 | 5 (Max) |
| 4. | pH value | 7.1 | 7.1 | 6.5 to 8.5 |
| 5. | Total hardness as ($CaCO_3$), mg/l | 204 | 202 | 300 (Max) |
| 6. | Iron (as Fe), mg/l | 0.1 | 0.1 | 0.3 (Max) |
| 7. | Chlorides (as Cl) mg/l | 66 | 62 | 250 (Max) |
| 8. | Dissolved solids, mg/l | 400 | 385 | 500 (Max) |
| 9. | Calcium (as Ca), mg/l | 45 | 45 | 75 (Max) |
| 10. | Magnesium (as Mg), mg/l | 22 | 22 | 30 (Max) |
| 11. | Copper (as Cu), mg/l | <0.01 | <0.01 | 0.05 (Max) |
| 12. | Manganese (as Mn), mg/l | <0.01 | <0.01 | 0.1 (Max) |
| 13. | Sulphate (as $SO_4$), mg/l | 50 | 48 | 200 (Max) |
| 14. | Nitrate (as $NO_3$), mg/l | 2 | 2 | 45 (Max) |
| 15. | Fluoride (as F), mg/l | 1.0 | 1.0 | 1.0 (Max) |
| 16. | Phenolic com-pounds (as | Nil | Nil | 0.001 (Max) |
| 17. | Mercury (as Hg), mg/l | <0.001 | <0.001 | 0.001 (Max) |
| 18. | Cadmium (as Cd), mg/l | <0.01 | <0.01 | 0.01 (Max) |
| 19. | Selenium (as Se), mg/l | <0.01 | <0.01 | 0.01 (Max) |
| 20. | Arsenic (as As), mg/l | <0.01 | <0.01 | 0.05 (Max) |
| 21. | Cyanide (as CN), mg/l | Nil | Nil | 0.05 (Max) |
| 22. | Lead (as Pb), mg/l | 0.01 | 0.01 | 0.05 (Max) |
| 23. | Zinc (as Zn), mg/l | 0.06 | 0.06 | 5 (Max) |
| 24. | Anionic deter-gents (MBAS), mg/l | Nil | Nil | 0.2 (Max) |
| 25. | Chromium (as $Cr^{6+}$), mg/l | <0.01 | <0.01 | 0.05 (Max) |

TABLE 2-continued

| | | Results Obtained | | |
|---|---|---|---|---|
| S. No. | Physio-chemical characteristics | MCD water Raw | MCD water through membrane | ISO requirement Desired limits |
| 26. | Mineral oil, mg/l | Nil | Nil | 0.01 (Max) |
| 27. | Alkalinity (as $CaCO_3$), mg/l | 165 | 155 | 200 (Max) |
| 28. | Aluminum (as Al), mg/l | <0.01 | <0.01 | 0.03 (Max) |
| 29 | Boron (as B), mg/l | Nil | Nil | 0.03 (Max) |
| 30. | Bacteriological Test MPN Coliform/100 ml | Nil | Nil | 10 (Max) |

TABLE 3

| Sample No. | Concentration of stock solution of virus (pfu/ml) | virus in the filtrate (pfu/ml) |
|---|---|---|
| 10696 | $1 \times 10^{-4}$ | 0.0 |
| 22296A | $2 \times 10^{-5}$ | 0.0 |
| C15 | $5 \times 10^{-3}$ | 0.0 |
| 16997 | $1 \times 10^{-4}$ | 0.0 |
| 221097 | $2 \times 10^{-4}$ | 0.0 |

(Tests conducted at the Department of Microbiology, All India Institute of Medical Sciences New Delhi, India)

The Advantages in the Method Are:

There is no modification of pH needed in the water sample which can be filtered through the developed membrane filter. Hence no chemical treatment is required before water samples can be used for filtration. The test result shows that about 100% viruses can be easily trapped on the membrane. The membrane can be easily prepared in wide range of polymerization temperatures using cold bath. The membrane when sealed in plastic envelops has a shelf life of at least eight months. The membrane is very easy to handle. Reference is made to the finding by Garner et. al, J. Mater. Sci., 10, 19 (1999) which shows that polypyrrole is found to be bio compatible in nature which further enhances the utility of such membranes as prepared by the process of present invention.

What is claimed is:

1. A process for preparing conducting polymer impregnated porous substrate membrane useful as a filter for capturing viruses in water comprising i) distilling pyrrole and N-methyl pyrrole separately;

ii) mixing 90 to 99.9 vol % distilled pyrrole and 10 to 0.1 vol % distilled N-methyl pyrrole obtained in step (i) above, followed by cooling the mixture to a temperature below 4° C. and up to −10° C.;

iii) mixing 60 to 40 vol % alkyl acetate to 40 to 60 vol % cooled pyrroles mixture obtained in step (ii) above;

iv) soaking a porous substrate in the mixture obtained in step (iii) above, cooling the said impregnated substrate to a temperature below 4° C. and allowing it to stand for at least 1 hr;

v) treating the impregnated substrate obtained in step (iv) above with a solution of ferric chloride in an inert atmosphere at a temperature ranging between 1° C. to −10° C. for a period ranging from 1 to 5 hrs. to obtain a conducting polymeric membrane;

vi) washing the polymeric membrane obtained in step (v) above followed by drying in oxygen free atmosphere to obtain the desired membrane.

2. A process as claimed in claim 1, wherein, the alkyl acetate used as a stabilizer is selected from methyl acetate, ethyl acetate and propyl acetate.

3. A process as claimed in claim 1, wherein the porous substrate is filter paper.

4. A process as claimed in claim 1, wherein the washing of conducting polymeric membrane is done by using any clean water selected from distilled water or deionized water.

5. A process as claimed in claim 1, wherein the inert atmosphere is maintained by using gases selected from nitrogen, argon and helium.

6. A conducting copolymer impregnated porous substrate membrane having electrical conductivity ranging between $5.9 \times 10^{-1}$ to $1.7 \times 10^{-1}$ $\Omega^{-1}$ $cm^{-1}$ and a shelf life of at least eight months.

7. A substrate as claimed in claim 6, wherein said copolymer is a copolymer of pyrrole and N-methyl pyrrole.

* * * * *